United States Patent [19]

Takada

[11] Patent Number: 4,565,338
[45] Date of Patent: Jan. 21, 1986

[54] EMERGENCY LOCKING SEAT BELT RETRACTOR WITH AUTOMATIC LOCKING MECHANISM

[76] Inventor: Juichiro Takada, 3-12-1 Shinmachi Setagayaku, Tokyo, Japan

[21] Appl. No.: 708,600

[22] Filed: Mar. 6, 1985

[30] Foreign Application Priority Data

Mar. 12, 1984 [JP] Japan ................................ 59-045665

[51] Int. Cl.[4] ........................ A62B 35/02; B65H 75/48
[52] U.S. Cl. ............................................... 242/107.4 B
[58] Field of Search ................. 242/107.4 R–107.4 E; 280/806; 297/478

[56] References Cited

U.S. PATENT DOCUMENTS 3,862,726 1/1975 Ulrich et al. ............... 242/107.4 D
4,171,782 10/1979 Rumpf ......................... 242/107.4 D
4,436,255 3/1984 Matsui et al. ............... 242/107.4 A Primary Examiner—John M. Jillons

[57] ABSTRACT

A seat belt retractor comprises a belt reel rotatably mounted in a frame, a ratchet wheel coupled to the belt reel for rotation therewith, and a pawl supported on the frame for movement between locking and unlocking positions with the ratchet wheel. A mechanism responsive to rotational acceleration of the belt reel above a selected level moves the pawl to the locking position. A mechanism responsive to a selected amount of rotation of the belt reel in the belt-unwinding direction automatically urges the pawl resiliently to the locked position. This mechanism also responds to a selected amount of rewinding of the belt by automatically urging the pawl resiliently to the unlocked position. The aforementioned mechanism includes a pivotable actuator engageable with the pawl in the locked and unlocked positions through a lost motion coupling, an over-center spring biasing the actuator toward said engagements while allowing lost motion, whereby the pawl can move between the locked and unlocked positions against the bias of over-center spring, and a reduction mechanism coupled to the reel and including a rotatable output member having two circumferentially spaced-apart lugs, one of which engages and moves the actuator to one over-center position upon unwinding of the belt and the other of which engages and moves the actuator to the other over-center position upon rotation of the belt in the belt-winding direction.

3 Claims, 5 Drawing Figures

EMERGENCY LOCKING SEAT BELT RETRACTOR WITH AUTOMATIC LOCKING MECHANISM

DESCRIPTION

1. Field of the Invention

The present invention relates to vehicle safety seat belt retractors and, in particular, to an emergency locking type retractor having a mechanism that changes the locking mode from emergency locking to automatic locking.

2. Background of the Invention

A well-known and widely used type of vehicle safety seat belt retractor, the emergency locking type, allows the belt to be unwound except when the vehicle is abruptly decelerated or accelerated, such as occurs in a collision. Numerous mechanisms that detect the rate of change in vehicle speed (positive or negative acceleration) by an inertia detecting device and lock the belt reel when the acceleration exceeds a preset level are known in the prior art. Such mechanisms may respond directly to acceleration of the vehicle in any direction, e.g., in mechanisms that use pendulums, tilting weights or rolling or sliding masses, or to rapid acceleration of the belt reel, e.g., mechanisms that include an inertia wheel that normally rotates with the belt reel but lags behind the reel due to rapid unwinding (rotary acceleration) of the belt. Emergency locking retractors are popular because they allow the user to change position or loosen the belt for comfort at will.

The ability of the belt to unwind from an emergency locking retractor against the relatively small force of the winding spring, which force is kept small so that the belt is not pulled uncomfortably tightly against the wearer) presents a problem when a conventional emergency locking retractor is used to secure child safety seat to the vehicle seat. The problem is that the safety seat can move forward or sideways due to braking, turning or other normal maneuvers and motions of the vehicle. Moreover, a collision is often preceded by a sharp turn or hard braking that is intended to avert the collision or that itself results in a collision (e.g., loss of control or a skid). The child safety seat may move in these situations, with the result that it is not tightly held on the vehicle seat and can, along with its occupant, be thrown about when a collision occurs.

The above-described problem is well known and various solutions have been proposed, among them manual locking devices which require the user to push a button or move a lever to change the mode of operation of the reel locking mechanism from emergency to automatic.

Matsui U.S. Pat. No. 4,436,255 describes and illustrates a seat belt retractor that automatically changes back and forth between an emergency-locking mode and an automatic-locking mode in accordance with the winding and unwinding of the belt, the conversion being caused by a cam wheel that rotates through a small fraction of a revolution for each revolution of the belt reel. The cam wheel moves a spring between positions holding a locking pawl in engagement with a locking ratchet wheel of the retractor and a position out of engagement with the ratchet wheel, the latter position establishing the emergency locking configuration of the retractor. The spring continually engages the cam wheel and is subject to friction and wear whenever the belt is being wound onto or unwound from the reel.

SUMMARY OF THE INVENTION

There is provided, according to the invention, a seat belt retractor comprising a belt reel rotatably mounted in a frame and resiliently urged to rotate in one direction to wind the belt onto the reel. A ratchet wheel is coupled to the belt for rotation therewith, and a pawl is supported on the frame for movement between a locking position in engagement with a tooth of the ratchet wheel to prevent rotation of the reel in the belt-unwinding direction and a non-locking position clear of the path of ratchet wheel teeth. A mechanism responsive to rotational acceleration of the belt reel above a selected level moves the pawl to the locking position. A mechanism responsive to a selected amount of rotation of the belt reel in the belt-unwinding direction automatically urges the pawl resiliently to the locked position. This mechanism is also responsive to a selected amount of rewinding of the belt to urge the pawl resiliently to the unlocked position. The aforesaid mechanism includes a pivotable actuator engageable with the pawl in the locked and unlocked positions through a lost motion coupling, an over-center spring biasing the actuator toward said engagements while allowing lost motion, whereby the pawl can move between the locked and unlocked positions against the bias of over-center spring, and a reduction mechanism coupled to the reel and including a rotatable output member having two circumferentially spaced-apart lugs, one of which engages and moves the actuator to the other over-center position upon rotation of the belt in the belt-winding direction.

In a preferred embodiment the pawl and actuator are pivotable about a common axis, and the lost motion coupling between the actuator and pawl includes a lug on the actuator and circumferentially spaced-apart shoulders on the pawl engageable with the lug. The reduction mechanism may be a planetary gear train having a sun gear coupled to the belt reel, a ring gear fixed to the frame, a planet carrier, and a planet gear rotatably carried by the planet carrier and meshing with the sun and ring gears, the planet carrier constituting the output member having the two lugs.

A seat belt retractor, according to the present invention, thus normally functions as an emergency locking type seat belt retractor when used by a vehicle occupant without a child safety seat. In order to fasten a child safety seat to the vehicle seat, the seat belt is pulled out to a considerable length, for example, substantially the whole length, whereupon one of the two lugs provided on the output element of the reduction mechanism automatically engages the pawl with the ratchet wheel by means of the actuator, and this engagement is maintained by the over-center spring. Therefore, the seat belt cannot thereafter be pulled out, though it can be taken up. Consequently, the fastening of the child safety seat to the vehicle seat can be achieved without any chance of the child seat moving from the secured position.

When the child safety seat is removed from the secured position (for removal from the vehicle or for movement to another location in the vehicle), the belt is undone and allowed to rewind into the retractor. After rewinding to a certain extent, for example, 80% of complete rewinding (i.e., 20% of the belt unwound), the other lug disengages the pawl from the ratchet wheel by moving the actuator and the retractor is automatically converted back to a condition for operating in the emergency locking mode. Since the start and the end of the automatic locking mode are caused by different lugs, the amounts of unwinding and rewinding required to convert to and from the automatic mode can be established freely and independently of each other, in relation to the length of the seat belt which is unwound, by the positions of the lugs. For different uses of the retractor (different vehicles and belt systems) the same basic retractor design can be used, and only the output element, and on occasion the ratio of the reduction mechanism, need be changed. This is a considerable cost-saving advantage afforded by the invention.

When a retractor according to the present invention is in the automatic locking configuration, the locking pawl is resiliently held in a position in engagement with the ratchet wheel. Accordingly, vibration of the vehicle cannot produce a loosening of the belt. Also, the retractor does not have a rotary cam that constantly works against a follower element, so the problems of friction and wear do not exist.

For a better understanding of the invention reference may be made to the following description of an exemplary embodiment taken in conjunction with the figures of the accompanying drawings.

DESCRIPTION OF THE EMBODIMENT

Figure 1:
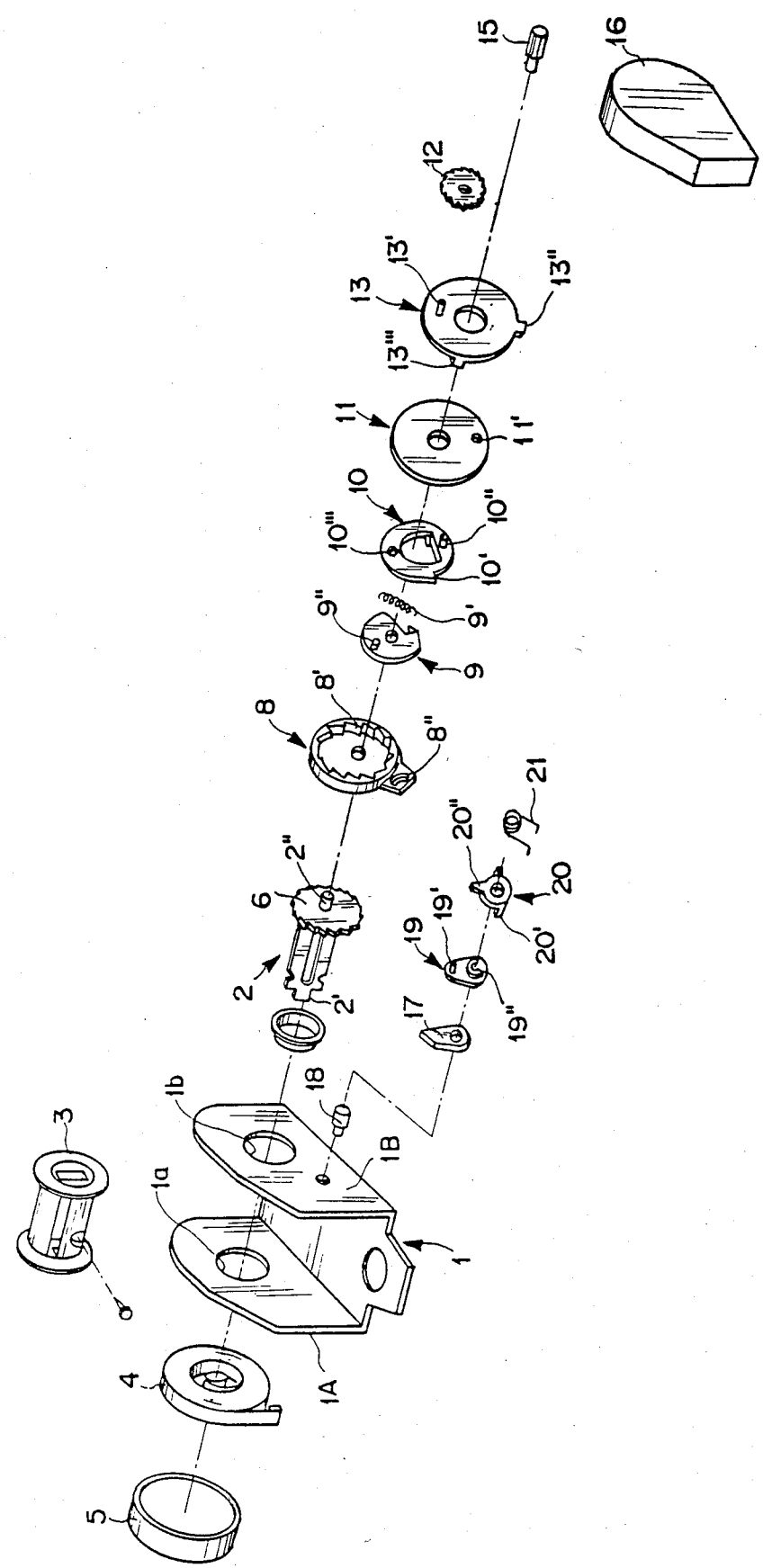
FIG. 1 is an exploded pictorial view of the embodiment.

The embodiment comprises a U-shaped frame 1 and a reel shaft 2 to which a seat belt (not shown) is fastened. The shaft 2 is supported rotatably by bushings in holes 1a, 1b in the side walls 1A, 1B of the frame 1. A belt reel 3, upon which the seat belt is wound between the side walls 1A, 1B of the frame 1, is mounted on the main shaft 2. A winding spring 4 is joined at one end to one end 2' of the shaft 2, and the other end of the spring 4 is fixed to a cover 5 fastened to the side wall 1A. A ratchet wheel 6 is affixed on the end portion 2" of the shaft 2 outside the side wall 1B. The portion 2" of the shaft 2 that projects outwardly from the ratchet wheel 6 has a flattened shape (see FIGS. 2 to 5). A retainer 9 is mounted fixedly on the flattened portion 2" of the shaft outwardly of a lock ring 8. The lock ring 8 is loosely (rotatably) mounted on a round boss (not shown) on the inside face of the retainer 9. The lock ring 8 is provided with internal teeth 8', with which a tooth 10' on a hook member 10 (described below) is engageable. A pin 9" on the retainer 9 is received loosely in a hole 10''' in the hook member 10, the hook being thereby supported movably on the retainer 9. A spring 9' engaged under compression between the hook 10 and retainer 9 normally prevents the tooth 10' of the hook 10 from engaging the internal teeth 8' on the lock ring 8.

An inertia wheel 11 is suitably mounted (e.g., by a circular boss on the retainer or on the sun gear 15 described below) loosely (rotatably) on the shaft portion 2" outwardly of the hook 10. A hole 11' in the wheel 11 receives a pin 10" projecting from the hook 10. A planet carrier 13 serving as an output element of a planetary reduction mechanism is suitably mounted for rotation on the portion 2" outwardly of the inertia wheel 11. A planet gear 12 is mounted rotatably on a pin 13' projecting from the carrier. The carrier 13 is also provided on the portions thereof which are in the vicinity of the outer circumference thereof with two circumferentially spaced-apart lugs 13", 13''' that cooperate with an actuator 20, which will be described later. The planet gear 12 meshes with a sun gear 15, which is mounted on the shaft portion 2''', and with an internal gear 16' (shown by phantom lines in FIGS. 4 and 5) provided on the inside of a cover 16. This cover 16 is fixed to the side wall 1B of the frame 1. Consequently, in accordance with the rotation of the sun gear 15, which is mounted fixedly on the shaft portion 2", resulting from withdrawal and unwinding of the belt the rotational motion of the carrier 13 is reduced to a small fraction of the rotational motion of the sun gear 15, and the carrier 13 rotates in the same direction as the sun gear 15. This reduction ratio may be, for example, 1/6, in which case, if the number of turns of the seat belt around the reel 3 is seven, the carrier 13 makes one full revolution while the reel 3 revolves six times around its axis. The planetary gear mechanism may, of course, be replaced by some other type of rotary motion reduction mechanism.

A pawl 17 engageable with the teeth of the ratchet wheel 6 is mounted rotatably on a pin 18 fixed to the side wall 1B of the frame 1. A retainer 19 is also mounted rotatably on the pin 18 outwardly thereof and is suitably fixed to the pawl 17 so that it moves conjointly with the pawl. The retainer 19 has a pin 19' projecting out parallel to the shaft axis and received in a cam slot 8" in the lock ring 8. Accordingly, when the lock ring 8 is rotated around the shaft portion 2''', the pin 19' is guided along the cam slot 8" to cause the retainer 19 and the pawl 17 to be rotated around the pin 18. A boss on the retainer 19 has a notch 19" extending at a predetermined angle α, the ends of which constitute shoulders that allow limited relative motion between the retainer and an actuator 20 upon engagement of a projection 20' on the actuator 20, which is mounted rotatably on the pin 18, being received in the notch 19". Since the width of the projection 20' is about ½ of the circumferential dimension between the shoulders of the notch 19", the actuator 20 and the retainer 19 can rotate relative to each other within a predetermined range. This arrangement provides, therefore, a lost motion coupling between the pawl 17 and the actuator 20 (the retainer 19 being rotatable with the pawl).

The actuator 20 has a lever portion 20" which cooperates with the lugs 13", 13''' of the carrier 13. An over-center spring 21 is fastened at one end to the actuator 20, and at the other end to a non-movable member, for example, the cover 16, and urges the actuator 20 toward one or the other of two positions, depending on how the lever portion 20" of the actuator 20 is moved by the lugs 13" and 13'''. The pawl 17, in turn, is biased by the actuator 20 through the retainer 19 to a position in which it engages the ratchet wheel 6 or a position in which it is disengaged from the ratchet wheel.

Figure 2:
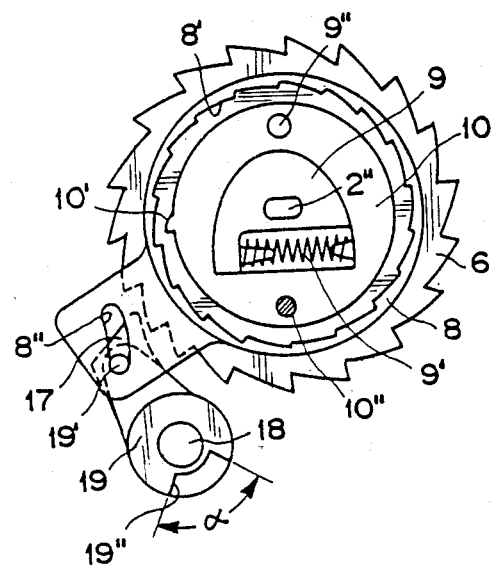
FIGS. 2 and 3 are diagrammatic views of the components of the locking mechanism of the embodiment involved in the emergency locking mode, FIG. 2 showing the unlocked configuration and FIG. 3 showing the locked configuration.
Figure 3:
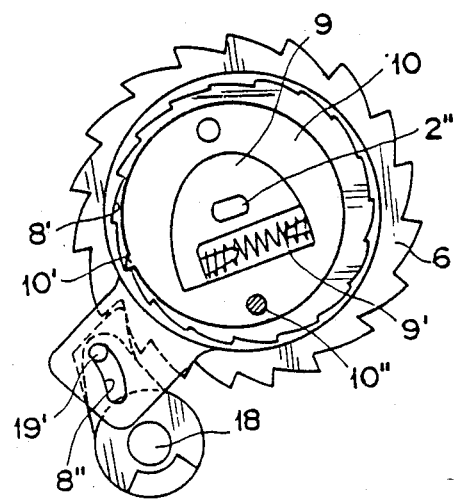

The operation of the above-described seat belt retractor according to the present invention will now be described, referring initially to FIGS. 2 and 3.

In the normal use of the seat belt retractor, i.e., when it is applied to an occupant sitting on the vehicle seat, the seat belt is withdrawn, for example, 70 to 80% of complete withdrawal. In this case, the seat belt receives tension in the belt-winding direction by the resilient force of the return spring 4 so as to be taken up around the reel 3. Upon a sudden positive or negative acceleration of the vehicle, such as occurs in a vehicle collision, that causes the occupant to be thrown forward so that the belt is pulled rapidly from the retractor, the rotation of the inertia wheel 11 mounted loosely on the shaft pin 2″ formed on the main shaft 2 is delayed (lags behind) relative to that of the retainer 9, which is mounted fixedly on the main shaft 2. Consequently, the tooth 10′ of the hook 10 carried by the retainer 9 is meshed with one of the internal teeth 8′ of the lock ring 8, as shown in FIG. 3, and the rotation of the main shaft 2 is transmitted through the lock ring 8 to the pin 19′, which is engaged with the cam slot 8″ provided in the outer cam portion of the lock ring 8, such transmission being via the retainer 9, hook 10 and lock ring 8, so that the retainer 19 and pawl 17 are turned clockwise (see FIG. 3). As a result, the pawl 17 engages one of the teeth of the ratchet wheel 6 mounted fixedly on the main shaft 2, thereby to lock the reel from rotating in the belt unwinding direction and preventing the seat belt from being pulled out. Thus, when the seat belt retractor is used normally, it works as a belt pull-out sensor type emergency locking seat belt retractor; i.e., the reel is locked in response to rapid rotational acceleration of the belt reel when the belt is abruptly pulled out.

Figure 4:
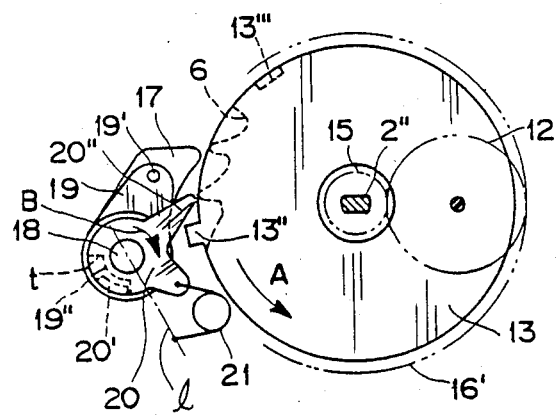
FIGS. 4 and 5 are diagrammatic views of the components of the embodiment involved in converting the locking mechanism between the emergency and the automatic locking modes.
Figure 5:
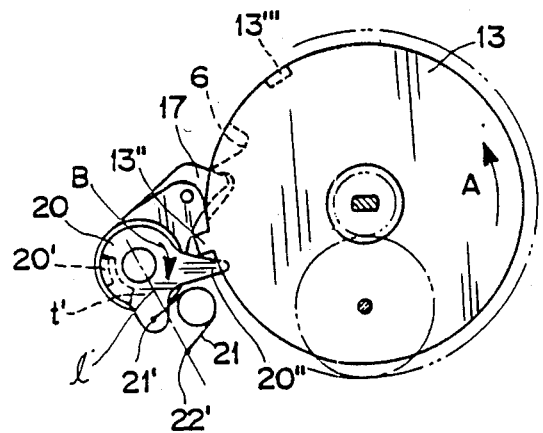

When the tension in the seat belt in the locked condition of the retractor (FIG. 3) is relaxed, the pawl 17 is disengaged from the ratchet wheel 6 by transmission of the resilient force of the over-center spring 21 through the lug 20′ on the actuator 20, which is in engagement with a shoulder t′ (FIG. 5) of the notch 19′ in the retainer 19, as may be seen in FIG. 4.

The conversion of the retractor from the emergency locking mode to the automatic locking mode occurs automatically when the seat belt is nearly fully unwound from the reel. When the seat belt is thus unwound, the shaft portion 2″ on the shaft 2 is rotated, for example, seven times, but the carrier 13 is rotated through only a little less than one revolution in the same direction as the reel (i.e., in the direction of the arrow A, FIG. 4) by the sun gear 15, the planetary gear 12 and the internal gear 16′ on the cover 16. This rotation of the carrier 13 causes the lug 13″ thereon to engage the lever portion 20″ of the actuator 20 and rotate the actuator in the direction of the arrow B (see FIG. 5). When the actuator 20 is rotated, the projection 20′ engages the shoulder t of the notch 19″ in the retainer 19 and rotates the pawl 17 into engagement with the ratchet wheel 6 via the retainer 19. Since one end 21′ of the spring 21 is fastened to the actuator 20 while the other end 21′ is fixed to a non-movable member, the spring 21 biases the actuator 20 in the direction of the arrow B when the end 21′ passes a line l, which connects the end 21′ and the center axis of the pin 18, during the pivotal movement of the actuator 20. Consequently, the pawl 17 is now biased by the resilient force of the spring 21 in a direction in which the pawl engages with the ratchet wheel 6, the main pawl 17 being then held resiliently in the engaged position.

The pawl engages one of the teeth of the ratchet wheel 6 due to the resilient force of the spring 21. Therefore, the ratchet wheel 6 and belt reel are locked against rotation in the belt-unwinding direction. Nonetheless, the belt can be taken up freely in the winding direction, because the spring 21 can yield to allow the ratchet wheel to move under the pawl. Accordingly, in order to secure a child safety seat to a vehicle seat, the seat belt is nearly fully withdrawn from the reel, pulled across the safety seat and done up, the slackened part of the seat belt being then allowed to be taken up on the reel 3 by the winding spring 4. As a result, the seat belt is locked in the belt-unwinding direction, and the safety seat is now fastened reliably and securely to the vehicle seat.

Restoration of the retractor to the emergency locking mode occurs automatically when the belt is undone and allowed to rewind nearly completely onto the reel. When the seat belt is thus rewound, the carrier 13 is turned at a reduced amount in the direction which is opposite to the direction of the arrow A. When nearly the entire length of the seat belt is taken up on the reel, the lug 13‴ on the carrier 13 engages the lever portion 20″ of the actuator 20 and rotates it in the direction which is opposite to the direction of the arrow B. When the actuator 20 is rotated, the projection 20′ on the actuator 20 engages the shoulder t′ of the notch in the retainer 19 in the direction in which the main pawl 17 disengages from the ratchet wheel 6. The main pawl 17 is thus freed from engagement with the ratchet wheel 6 (see FIG. 4). When the end 21′ of spring 21 passes the line l, (i.e. moves over center) the actuator 20 is biased by the spring 21 in the direction which is opposite to the direction of the arrow B. Consequently, the pawl 17 is biased by the resilient force of the spring 21 in the direction away from engagement with the ratchet wheel. The retractor is, therefore, restored to the emergency locking configuration.

I claim:

1. A seat belt retractor comprising a belt reel rotatably mounted in a frame and resiliently urged to rotate in one direction to wind the belt into the reel, a ratchet wheel coupled to the belt reel for rotation therewith, a pawl supported on the frame for movement between a locking position in engagement with a tooth of the ratchet wheel in which rotation of the reel in the belt-unwinding direction is prevented and a non-locking position clear of the path of ratchet wheel teeth, means responsive to rotational acceleration of the belt reel above a selected level for moving the pawl to the locking position, and means responsive to a selected amount of rotation of the belt reel in the belt-unwinding direction for automatically urging the pawl resiliently to the locking position and responsive to a selected amount of rewinding of the belt reel for automatically urging the pawl resiliently to the non-locking position including a pivotable actuator engageable with the pawl in the locked and unlocked positions through a lost motion coupling, an over-center spring biasing the actuator toward said engagements while allowing lost motion, whereby the pawl can move between the locked and unlocked positions against the bias of the over-center spring, and a reduction mechanism coupled to the reel and including a rotatable output member having two circumferentially spaced-apart lugs, one of which engages and moves the actuator to one over-center position upon unwinding rotation of the belt reel and the other of which engages and moves the actuator to the other over-center position upon rotation of the belt in the belt-winding direction.

2. A seat belt retractor according to claim 1 wherein the pawl and actuator are pivotable about a common axis and wherein the lost motion coupling between the actuator and pawl includes a lug on the actuator and circumferentially spaced-apart shoulders on the pawl engageable by the lug.

3. A seat belt retractor according to claim 1 wherein the reduction mechanism is a planetary gear train having a sun gear coupled to the belt reel, a ring gear fixed to the frame, a planet carrier, and a planet gear rotatably carried by the planet carrier and meshing with the sun and ring gears, the planet carrier constituting the output member having the two lugs.

* * * * *